Feb. 6, 1968     P. C. CULVER     3,368,182
AXIALLY OPERATED COUPLING DEVICE
Filed Oct. 11, 1965     3 Sheets-Sheet 1
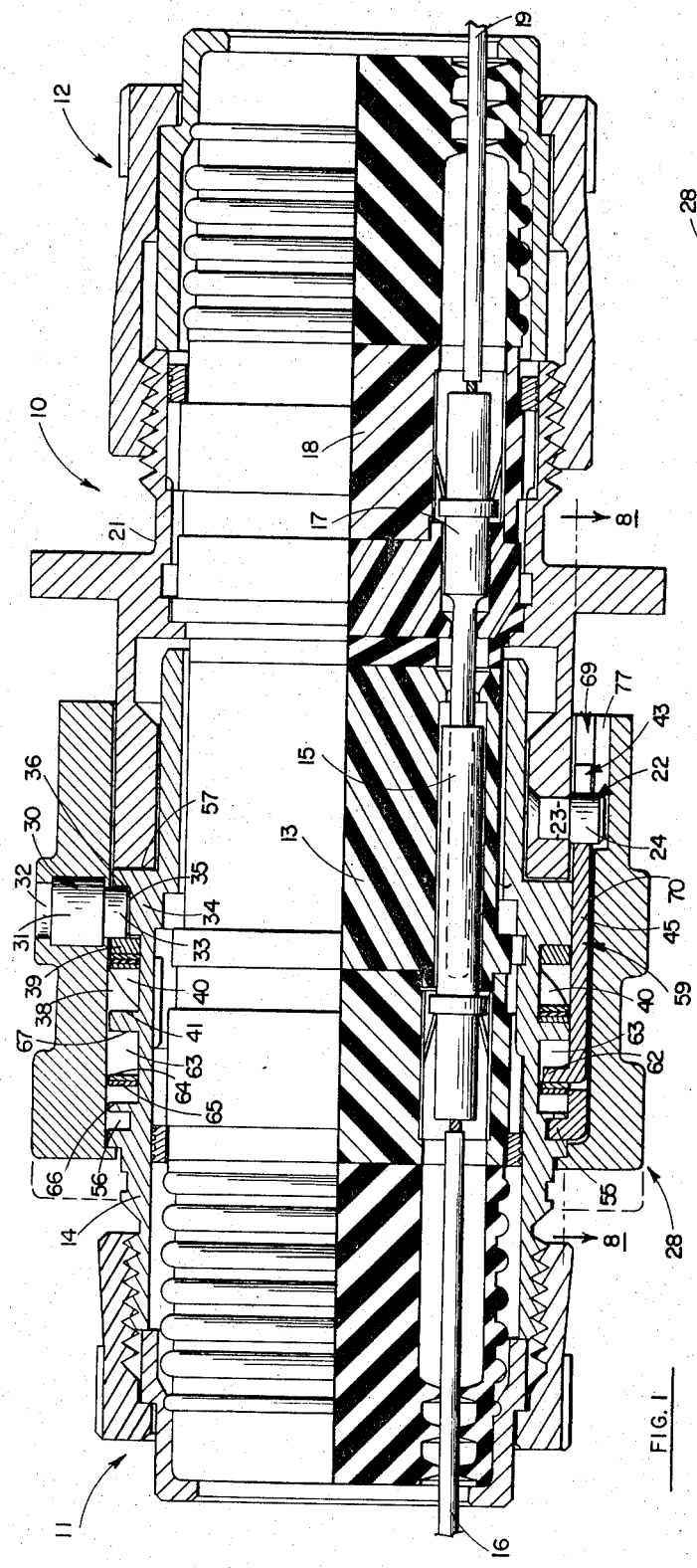
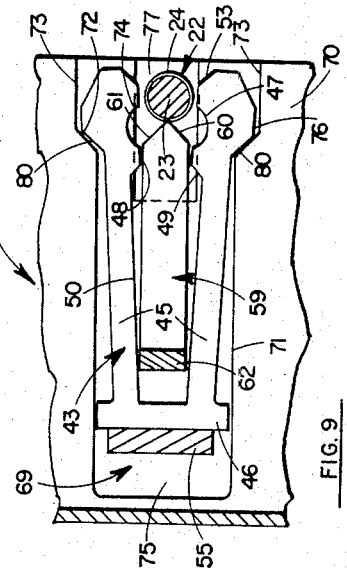
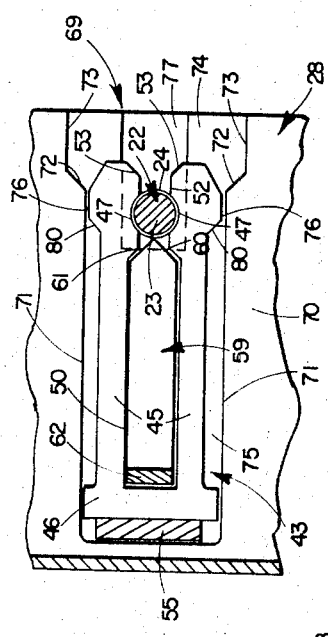
INVENTOR
PERRIN C. CULVER
BY
ATTORNEYS

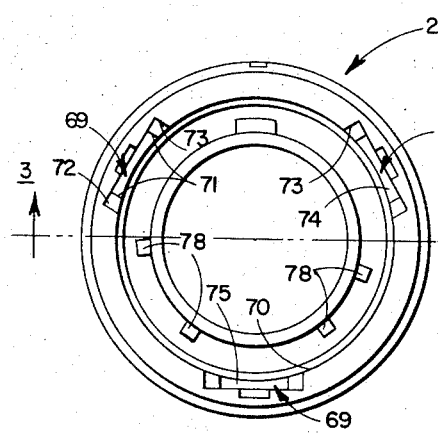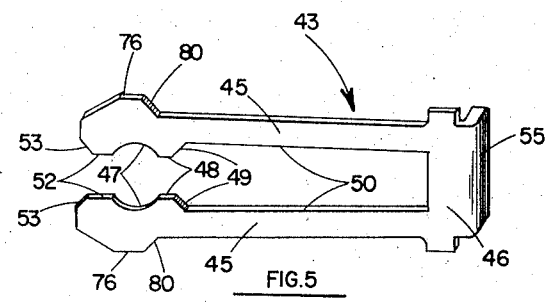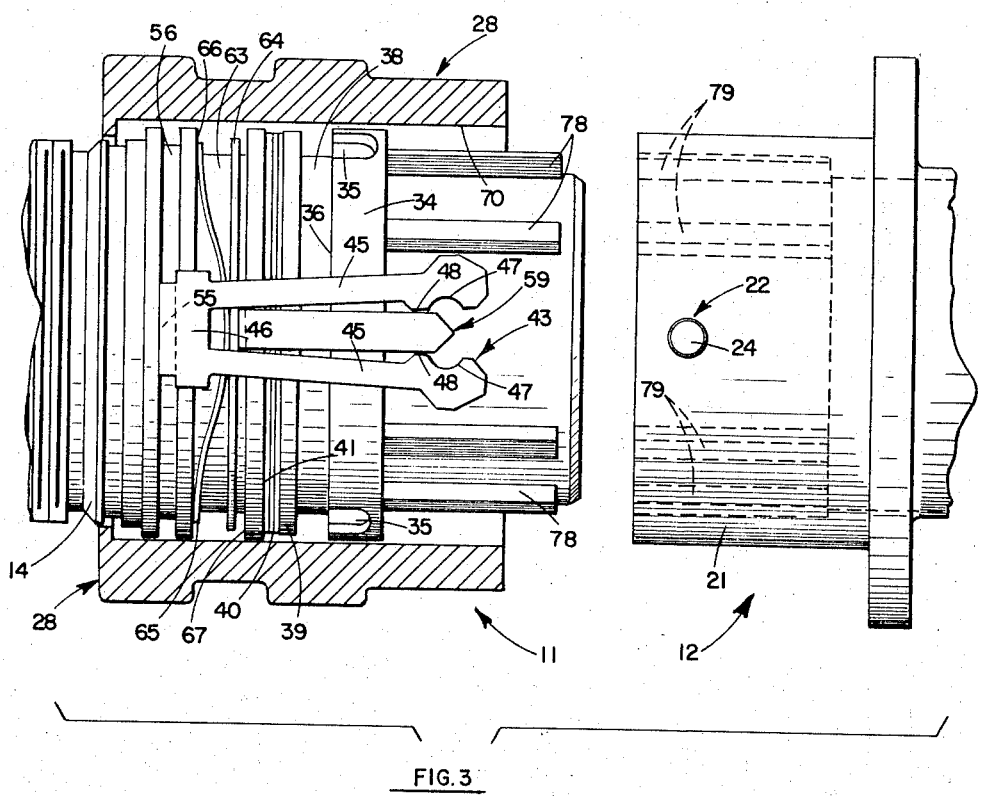

Feb. 6, 1968 P. C. CULVER 3,368,182
AXIALLY OPERATED COUPLING DEVICE
Filed Oct. 11, 1965 3 Sheets-Sheet 3

INVENTOR
PERRIN C. CULVER
BY
ATTORNEYS

United States Patent Office 3,368,182
Patented Feb. 6, 1968

3,368,182
AXIALLY OPERATED COUPLING DEVICE
Perrin C. Culver, Banning, Calif., assignor to The Deutsch Company Electronic Components Division, Banning, Calif., a corporation of California
Filed Oct. 11, 1965, Ser. No. 494,607
9 Claims. (Cl. 339—91)

ABSTRACT OF THE DISCLOSURE

A coupling device including a locking member having a flange received in a recess in a first member and having a bifurcated portion extending from the flange and movable between open and closed positions and, when in said closed position, engaging a projecting element on a second member for joining the first and second members, the device including a spring-biased tongue movable to open the bifurcated portion of said locking member to allow separation of the first and second members, the tongue being movable between the sections of the locking member to prevent closing thereof when the first and second members are separated.

---

This invention pertains to a coupling operated by a push-pull action.

One principal field of use of the invention is in securing together the mating sections of multiple pin-and-socket type electrical connectors. Typically, such connectors will include in one side a number of sockets joined to individual wires and mounted in a block of insulation. Pins will be carried by the other section of the connector, similarly connected to wires and mounted in a block of insulation, and adapted for entry into the sockets to complete an electrical circuit when the connector is secured. In holding the two sections of the connector together, it has been the practice frequently to employ some form of threaded sleeve or collar on one part to mate with complementary threads circumscribing the other connector section. This will effect a secure attachment, but requires access to the periphery of the connector during its use to accomplish the rotation necessary to couple and uncouple the device. For many uses, there may be insufficient space available to allow the threaded sleeve to be reached and turned. Also, a threaded joint necessitates some means to lock the parts together to prevent separation from vibration, thus adding another complexity.

There have been proposals for coupling arrangements in which the parts to secure the mating sections of the connector together are entirely axially operated, thereby avoiding the problems encountered with threaded connectors. These devices, however, generally have lacked strength and may not give full assurance of remaining in a secured position while in service.

One type of prior device has accomplished a strong connection similar in characteristics to that effected by a bayonet-type connector, yet operated without any rotation. The construction of this type coupling is shown in patent application Ser. No. 268,124, filed Mar. 26, 1963, now U.S. Patent No. 3,207,536, for Coupling Having Pin and Finger Clamping Means With Lock. The difficulty with that design, however, is in the size of the coupling. Electrical connectors are used in large numbers in space vehicles and aircraft, where interior volume is strictly limited and the parts must be made as small as possible. Minimum size is an absolute necessity for electrical connectors constructed for such purposes. This prior design requires the use of a radially movable element as part of the locking and release mechanism. The necessity for radial motion substantially increases the diameter of the connector, and severely limits its usefulness.

The present invention provides all the advantages of the push-pull bayonet-type coupling, but at the same time is of minimum diameter. It utilizes locking elements with fingers that close around short studs that thereby hold the two parts of the connector together. The fingers are maintained in engagement with the studs by a coupling ring having surfaces that can be positioned so that they will not allow the fingers to separate. To release the connector, the coupling ring is pulled back so that the surfaces no longer hold the fingers around the studs and the latter are free to be separated by an axial pull. As the studs move out from between the locking fingers, a tongue slides between them, being biased to this position by a spring. This tongue is a separate part that moves in an axial direction, and is a relatively small flat member. It is pushed back out of the way by the stud as it re-enters the space between the locking fingers when the connector is to be secured. The use of the axially movable tongue to hold the locking fingers apart avoids the necessity for any radially moving parts and allows the connector to be manufactured to a very small dimension.

An object of this invention is to provide an improved coupling device especially adapted for securing electrical connectors.

Another object of this invention is to provide a coupling actuated entirely by axial movement and made to a minimum width dimension.

A further object of this invention is to provide an aixally operable type coupling device that accomplishes a strong connection.

These and other objects will become apparent from the following detailed description taken in connection with the accompanying drawing in which:

FIGURE 1 is a longitudinal sectional view of an electrical connector embodying the coupling of this invention, with the two sections of the connector in the coupled position;

FIGURE 2 is an end elevational view of the plug portion of the connector;

FIGURE 3 is a longitudinal sectional view of the connector taken along line 3—3 of FIGURE 2, with the plug and receptacle separated;

FIGURE 5 is an enlarged perspective view of one of the locking members;

FIGURE 6 is an enlarged perspective view of the tongue that prevents premature closing of the locking member;

FIGURE 8 is a sectional view taken along line 8—8 of FIGURE 1; and

FIGURE 9 is a view similar to FIGURE 8 but illustrating the parts when the receptacle and plug are separated slightly.

Figure 4:
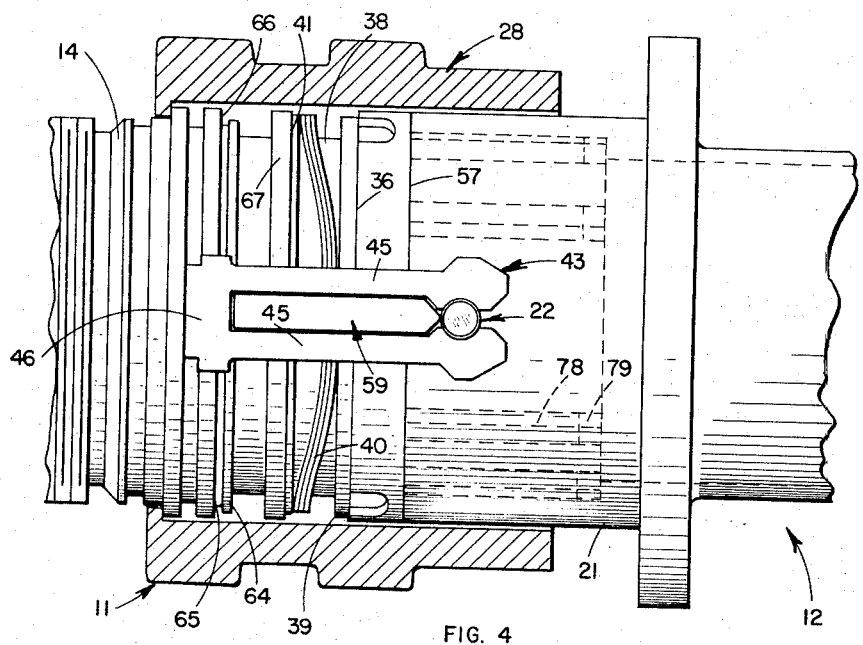
FIGURE 4 is a view similar to FIGURE 3, with the device in the connected position.
Figure 7:
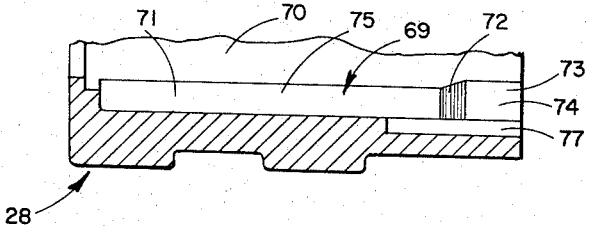
FIGURE 7 is an enlarged fragmentary longitudinal sectional view illustrating the recess in the coupling ring for the locking member.

As illustrated in the drawing, the coupling arrangement of this invention is shown in conjunction with a multiple pin-and-socket type electrical connector 10. This device typically includes a plug 11 that fits into a receptacle 12 when the connector is joined together as shown in FIGURE 1. In the embodiment illustrated, insulators 13 within the plug shell 14 retain a plurality of sockets 15 that are crimped or soldered to wires 16. The pins 17 to fit within the sockets 15 are held in insulators 18 in the receptacle 12. When the connector is mated as shown in FIGURE 1, the electrical circuits are completed from the wires 16 the sockets 15 are held in insulators 18 in the receptacle device could be constructed alternatively with the pins in the plug and the sockets in the receptacle.

The forward portion of the receptacle 12 is defined by a shell 21, from the circumference of which projects a plurality of short studs or posts 22. Typically, there are three of the posts 22 equally spaced around the circumference of the receptacle shell 21. Each post 22 may be made as a rivet, including an interior portion 23 that fits within a radial opening in the forward end of the shell 21, while the outer portion 24 of larger diameter projects radially above the periphery of the shell. These posts are gripped by the locking device in effecting a connection between the plug 11 and the receptacle 12.

A coupling ring or sleeve 28 circumscribes the plug shell 14, and is axially slidable relative to the plug shell. The coupling ring 28 is movable axially only a limited distance, and is biased forwardly, or to the right as the device is shown in FIGURES 1, 3 and 4. In FIGURE 3, the coupling ring 28 is shown in its rearwardmost position, while in FIGURES 1 and 4 it is illustrated in the normal forward position.

Spring force is used to bias the coupling ring 28 forwardly relative to the plug shell 14, and is applied to the coupling ring through interiorly extending studs 30. Typically, there are three of these studs, each having an enlarged exteriorly threaded portion 31 introduced into a threaded opening 32 extending through the periphery of the coupling ring. This leaves the short interior stud portion 33 projecting radially inwardly toward the plug shell 14. The plug shell includes an annular section 34 having axially extending grooves 35 extending inwardly a predetermined distance from the shoulder 36 at the rearward edge of this annular section. The interior portions 33 of the studs 30 fit within the grooves 35, and are slidable axially of the grooves.

The plug shell 14 is provided with an annular groove 38 immediately behind the shoulder 36, in which is positioned a flat split washer 39. This washer engages the rearward edges of the interior portions 33 of the stud elements 30. Behind the washer 39 in the groove 38 are split wafer springs 40. These are undulant springs, as seen in FIGURE 4, nesting together and urging the washer 39 to the right toward the shoulder 36 of the groove 38. In the position of FIGURE 3, the springs 40 are flattened because the coupling ring 28 is shown held in its retracted position, and the interior parts of the studs 30 through the washer 39 force the springs 40 against the shoulder 41 at the left end of the groove 38. Upon release of the coupling ring, the springs 40 react against the inner stud portions 33 to move the coupling ring 28 forwardly, or toward the right as the device is illustrated, to the position of FIGURES 1 and 4. This movement of the coupling ring is limited by the engagement of the inner stud portions 33 with the forward edges of the axially extending grooves 35. The rearward movement of the coupling ring is limited by the flattening of the wafer springs 40 against the shoulder 41 at the left-hand end of the groove 38.

There are three locking members 43 carried by the plug assembly, which are to engage the posts 22 of the receptacle and hold the coupling together. One of these locking members may be seen in the enlarged perspective view of FIGURE 5 separated from the remaining components of the connector. The locking member 43 is bifurcated, including a pair of longitudinally extending fingers 45 projecting from a base section 46. The fingers 45 at their distal ends include opposed arcuate surfaces 47 that define segments of a circle. The radius of this circle is substantially complementary to the radius of the exterior portion 24 of the pin 22 carried by the receptacle shell. Inwardly of the arcuate surfaces 47 are short straight edge surfaces 48, from which extend divergent surfaces 49 that lead to the longer opposed internal edges 50 of the fingers 45. Outwardly of the arcuate surfaces 47 are additional flat short edge surfaces 52, beyond which are divergent edges 53.

A flange 55 is bent to one side from the base section 46, and is adapted to enter an annular groove 56 formed in the plug shell 14. This axially fixes the locking members 43 so that they extend forwardly from the groove 56 and past the shoulder 57 at the forward edge of the annular section 34.

A flat tongue 59 is provided for each of the locking members 43 to fit between the projecting fingers 45. Each tongue 59 is V-shaped at one end by virtue of its outwardly convergent edge surfaces 60 and 61. A short flange 62 is bent at right angles from the opposite end of the tongue 59, being adapted to fit within a relatively wide annular groove 63 in the plug shell 14. The tongues are forwardly, or to the right as the device is shown in FIGURES 1, 3 and 4, of a thrust washer 64, in back of which are wafer springs 65. The springs 65 are similar to the springs 40, bearing against the thrust washer 64 and the shoulder 66 at the left-hand end of the groove 63. Therefore, the springs 65, through the washer 64 bearing against the flange 62, bias the tongues 59 toward the shoulder 67 at the right-hand end of the groove 63. Consequently, the tongues are urged to assume the position shown in FIGURES 3 and 8, in which their distal ends are between the locking fingers 45 adjacent the arcuate surfaces 47 and the edges 48. With the tongues 59 positioned in this manner, their ends are interposed between the portions of the fingers where their adjacent edges are enlarged inwardly so that the tongues hold the fingers in a laterally separated position.

The coupling ring 28 includes three shallow recesses 69 in its internal wall 70. These recesses receive the locking fingers 45 and control the positions of these fingers. Each recess includes a pair of relatively long opposed parallel walls 71 which, through divergent walls 72, connect to a second and shorter pair of opposed walls 73. Thus, the outer part 74 of the recess 69 is wider than the inner portion 75.

When the coupling ring 28 is moved to its retracted position, i.e., shifted to the left against the resisting force of the wafer springs 40, the spring fingers 45 are allowed to separate to the position shown in FIGURES 3 and 8. This is because the outer part 74 of the recess 69 is then opposite the ends of the fingers where their width is increased at the more widely spaced outer side edges 76 outwardly of the arcuate surfaces 47. The locking member is heat treated with the fingers spread apart so that in its free position the fingers separate to engage the side walls 73 of the outer recess portion 74. Regardless of this, finger separation of the locking member is assured by the tongue 59 which moves forwardly under the force of the springs 65. The V-shaped tongue end defined by the edges 60 and 61 reacts against the inclined surfaces 49 of the locking member to cam the fingers 45 apart, allowing the tongue 59 to move forwardly between the surfaces 47 and 48.

With the coupling ring retracted in this manner, it is possible to couple the device together by pushing the plug assembly 11 into the receptacle assembly 12. As this movement commences, the outer portions 24 of the pins 22 enter the recesses 69 and come into contact with the ends of the tongues 59. This is the position of FIGURE 9. The recesses 69 include thicker parts 77 to allow the pins 22 to move into the recesses. Keys 78 are provided on the plug 11 to mate with keyways 79 in the receptacle 12 so that these parts are rotationally aligned as they are brought together.

Continued movement of the plug into the receptcle causes the pins 22 to advance to the left of the position of FIGURE 9, pushing inwardly on the tongues 59. The tongues are forced back as the flanges 62 thereof, through the thrust washer 64, flatten the undulant wafer springs 65 against the shoulder 66 of the groove 63. This brings the pin portions 24 to a position intermediate the arcuate opposed surfaces 47 of the locking fingers 45. With the parts in this position, the coupling ring 28 is released, whereupon the wafer springs 40, acting through the thrust washer 39 and the inner stud portions 33, shift the coupling ring 28 to the right relative to the plug shell. As this occurs, the divergent surfaces 72 of the recess 69 react against the inclined outer edge surfaces 80 of the locking fingers 45, forcing the locking fingers toward each other. The wider outer portions of the locking fingers then enter the inner portions 75 of the recesses 69 between the opposed surfaces 71 of the recess, which, reacting through the outer edges 76 of the locking fingers, hold the locking fingers together, where they are substantially parallel. This brings the arcuate surfaces 47 around the pin portions 24, thereby capturing the pins 22 so that the plug and receptacle are held together. The locking fingers 45 cannot then be spread apart because the opposed surfaces 71 of the coupling ring recess will not allow this to occur.

The locking fingers in this manner provide a particularly strong connection securely gripping the pins 22 so that the connector cannot be separated.

Release of the device is accomplished by again pulling back on the coupling ring 28, shifting it to the left, so that the surfaces 71 no longer are opposed to the outer edges 76 of the locking fingers. This permits the locking fingers to move apart into the enlarged portion 74 of the recess 69 between the walls 73. With the walls 71 no longer confining the outer edges of the locking fingers, the pins 22 will be released and the device can be separated. As noted above, the free position for the spring fingers is to spread apart to completely disengage the pins 22. Even in the absence of this, the arcuate nature of the surfaces 47 would allow the pins 22 to be easily pulled out from between the locking fingers when the locking fingers are no longer held together.

As the pins 22 leave the locking fingers, they are followed by the tongues 59, which at their ends engage the pins 22. In other words, the wafer springs 65, through the thrust washer 64, move the tongues 59 to the right as the device is shown, causing them again to enter the space between the arcuate surfaces 47. When the tongues are in this position, it is impossible for the locking fingers to close. Thus, the tongues hold the locking fingers apart when ever the coupling ring has been shifted to its retracted position and the plug and receptacle separated. Consequently, there is always assurance that the pins 22 can enter the locking fingers and accomplish the coupling of the device. The locking fingers will never close prior to entry of the pins 22, because the tongues 59 hold the fingers apart prior to that time. It is only the pins 22 that shift the tongues 59 that separate the locking fingers. This provides a complete safety control that assures that the coupling is operative at all times.

An additional advantage is realized through the spring force applied to the coupling ring that urges it to the extended position when the coupling sections are locked together. With the springs 40 biasing the coupling ring 28 forwardly, it will move automatically to the position where it holds the locking members 43 around the pins 22 when the plug and receptacle are fitted together and the coupling ring is released. Thereafter, the spring force on the coupling ring will hold it in the locked position despite the presence of vibrational forces. Such forces actually assist the coupling ring in moving to and staying in its extended position. If some external force should happen to dislodge the coupling ring from its forward locked position and move it toward the rear, the spring force on it will return it immediately to the locked position. This contrasts with what would occur if the coupling ring were held forwardly by a detent or other non-resilient arrangement. In that event, the coupling ring would not move back to the secured position once it had been displaced from it, and the coupling would then be allowed to separate. Thus, the performance of the coupling device of this invention in maintaining a secure attachment under adverse conditions is enhanced by the spring bias upon the coupling ring.

Even with the secure connection provided by the coupling of this invention, only axial movement of the parts is required in securing the coupling together. Moreover, the connector is made to a minimum diameter because the elements of the coupling move only in a direction parallel to the axis. The connector, therefore, can be made as small as its other components permit, with no increase in volume resulting from the push-pull bayonet coupling of this invention.

The foregoing detailed description is to be clearly understood as given by way of illustration and example only, the spirit and scope of this invention being limited solely by the appended claims.

I claim:

1. A coupling device for securing a first member to a second member in longitudinal alignment, said device comprising a pin projecting transversely outwardly from said first member, a locking member extending longitudinally of said second member, said locking member including a substantially flat bifurcated portion, said bifurcated portion having opposed recesses, said bifurcated portion being movable to a closed position for engaging said pin at said recesses for securing said pin and preventing relative movement between said first and second members, said bifurcated portion being separable for releasing said pin, said locking member including a lateral flange, said second member having a first recess receiving said lateral flange for positioning said locking member on said first member, a movable member movable to two positions in one of which said movable member presents surfaces adjacent said bifurcated portion for holding said bifurcated portion in said closed position in engagement with said pin and in another in which said movable member presents surfaces allowing the separation of said bifurcated portion for releasing said pin, a longitudinally movable substantially flat safety member for preventing closure of said bifurcated portion other than when said pin is interposed at said bifurcated portion, said safety member having a projecting flange, said second member having a second recess slidably receiving said projecting flange of said safety member, and resilient means in said second recess biasing said safety member to a position where said safety member is between said bifurcated portion of said locking member at said opposed recesses for preventing closure of said bifurcated portion, said pin being engageable with said safety member upon longitudinal advancement of said first and second members toward each other for longitudinally moving said safety member relative to said second member to a position where said safety member is remote from said recesses and does not preclude movement of said bifurcated portion of said locking member to said closed position.

2. In combination with a first member and a second member to be joined, a coupling device for securing said members comprising at least one locking member extending longitudinally of said first member toward one end thereof, said locking member having a base flange portion and a duality of laterally separable fingers extending toward said one end thereof, said first member having a first recess receiving said base flange portion of said locking member for holding said locking member thereto,
said fingers having opposed recessed portions adjacent the distal ends thereof,
and outer surfaces outwardly of said recessed portions,
a sleeve circumscribing said first member and movable axially relative thereto between extended and retracted positions relative to said first member,
said sleeve having a recess receiving said locking member,
said recess having first and second sets of opposed walls,
said first set of opposed walls being engageable with said outer surfaces of said distal end portions of said fingers when said sleeve is in said extended position for holding said fingers in a first position adjacent to each other,
said second set of opposed walls being spaced further apart than said first set and positioned adjacent said distal end portions of said fingers when said sleeve is in said retracted position for permitting said fingers to separate laterally to a second position,
a tongue in said recess intermediate said fingers,
said tongue being movable longitudinally of said first member from a first position intermediate said recessed portions of said fingers for maintaining said fingers in said second position thereof,
and preventing said fingers from moving to said first position thereof,
said tongue being movable longitudinally of said first member to a second position remote from said recessed portions for permitting said second set of opposed walls to hold said fingers in said first position thereof, said tongue having a base flange portion thereon, said first member having a second recess slidably receiving said base flange portion of said tongue,
resilient means in said second recess engaging said base flange portion of said tongue and biasing said tongue toward said first position of said tongue,
resilient means biasing said sleeve toward said extended position,
and a post projecting outwardly from said second member and movable into said recess in said sleeve,
said post being engageable with said tongue for pushing said tongue from said first position of said tongue to said second position of said tongue
for permitting said fingers to assume said first position thereof and engage said post at said recessed portions thereof for securing said first and second members together.

3. An electrical connector comprising
a plug assembly,
a receptacle assembly,
one end of said plug assembly being adapted to enter said receptacle assembly,
said plug and receptacle assemblies including electrical contacts for making electrical connections when said plug assembly so enters said receptacle assembly,
a plurality of posts projecting radially outwardly from the periphery of said receptacle assembly, a sleeve circumscribing said plug assembly,
said sleeve including a plurality of recesses therein,
said recesses extending axially inwardly from one end of said sleeve,
said recesses including a first pair of opposed walls inwardly of said one end of said sleeve,
a second pair of opposed walls adjacent said one end of said sleeve,
and a pair of walls interconnecting said first and second walls,
said interconnecting walls being divergent toward said one end,
locking member in each of said recesses, each of said locking members having a laterally projecting flange, said plug assembly having a first recess receiving each of said laterally projecting flanges for fixing said locking members longitudinally of said plug assembly,
each locking member including a pair of fingers projecting from said flange toward said one end of said sleeve,
said fingers being enlarged at their adjacent edges and enlarged at their outer edges adjacent their distal ends,
said enlarged adjacent edges of said fingers being recessed,
said sleeve being movable selectively between
a first position where said first walls are adjacent said enlarged outer edges of said fingers
and a second position in which said second walls are adjacent said outer edges of said fingers,
said first walls of said recess being dimensioned to hold said fingers in a position of relative adjacency when said first walls are adjacent said enlarged outer edges of said fingers,
said second walls of said recess being dimensioned to allow said fingers to spread apart laterally when said enlarged outer edges are adjacent said second walls,
said fingers when in said position of relative adjacency being engageable with one of said posts that has so entered the recess thereof for retaining said post in said recess, whereby said locking members hold said plug and receptacle together,
a longitudinally movable tongue interposed between said fingers in each of said recesses,
each of said tongues having a convergent distal end
and being movable intermediate said enlarged adjacent edges of said fingers when said fingers are adjacent said second walls for thereby holding said fingers apart, each of said tongues having a base flange, said plug assembly including a second recess slidably receiving each of said base flanges,
and resilient means in said second recess biasing each of said tongues to said position intermediate said enlarged adjacent edges of said fingers,
said posts being engageable with said tongues upon advancement of said plug and receptacle assemblies toward each other for moving said tongues longitudinally of said plug out of said enlarged adjacent edges
for permitting said first walls on said recess in said sleeve to hold said fingers in said position of relative adjacency for engaging said posts and securing said connector together.

4. An electrical connector comprising
a plug assembly,
and a receptacle assembly,
said plug assembly being adapted to enter said receptacle assembly,
said plug and receptacle assemblies including interengageable electrical contacts for completing electrical circuits upon said entry of said plug assembly into said receptacle assembly, said plug assembly including a cylindrical shell one end of which is adapted for said entry into said receptacle assembly, an axially movable sleeve circumscribing said shell, resilient means interposed between said shell and said sleeve for biasing said sleeve from
- a first position relatively remote from said one end of said shell to
- a second position relatively adjacent said one end of said shell, at least one locking member,
- said locking member including a base portion having a flange thereon,
  - said shell having a first groove means receiving said flange for thereby axially fixing said locking member relative to said shell,
- said locking member having a pair of fingers extending axially of said shell toward said one end of said shell,
  - said fingers being laterally enlarged at their adjacent edges and at their outer edges at their distal ends,
    - said adjacent edges at said distal ends being recessed,
- said sleeve including a longitudinal recess extending inwardly from the end thereof adjacent said one end of said shell,
- said recess receiving said fingers of said locking member and including
  - a first pair of relatively closely spaced opposed walls at the inner end thereof,
  - a second pair of relatively widely spaced opposed walls at the outer end thereof,
  - and a pair of walls diverging toward the outer end of said recess and interconnecting said first and second pairs of walls,
- said sleeve when in said first position presenting said second pair of opposed walls adjacent said outer edges of said distal ends of said fingers for permitting said fingers to spread laterally apart, and when in said second position presenting said first pair of opposed walls adjacent said distal ends of said fingers for holding said fingers in a position of relative adjacency, a tongue intermediate said fingers,
- said tongue having a flange,
  - said shell having a second groove means receiving said flange of said tongue,
- and resilient means in said second groove means for biasing said tongue longitudinally of said shell toward said one end of said shell for positioning an end of said tongue intermediate said adjacent edges of said distal ends of said fingers for thereby holding said fingers apart and preventing said fingers from moving to said position of relative adjacency, said receptacle assembly including a radially extending post movable into said recess in said sleeve when said plug assembly so enters said receptacle assembly,
- said post being engageable with said end of said tongue for pushing said tongue longitudinally out of said adjacent portions of said distal ends of said fingers for permitting said fingers to move to said position of relative adjacency,
  - said post thereby entering said recesses in said fingers so that said fingers secure said plug and receptacle assemblies together.

5. The device as recited in claim 4 in which
said second groove means includes an annular groove circumscribing said shell,
and in which said last-mentioned resilient means includes a split undulant spring in said annular groove bearing against said flange of said tongue therein for thereby biasing said tongue toward said one end of said shell.

6. A device as recited in claim 4 in which
said resilient means interposed between said shell and said sleeve includes a stud extending radially inwardly from the inner circumferential wall of said sleeve,
- said shell including a groove extending axially a limited distance toward said one end for receiving said stud,
- and an annular groove inwardly of and in communication with said groove,
and at least one split annular undulant spring in said annular groove for engaging said stud and biasing said stud toward the end of said axially extending groove adjacent said end of said shell for thereby biasing said sleeve toward said end of said shell.

7. In combination with a first member and a second member to be fastened, a coupling device for said members comprising
at least one locking member carried by said first member,
- said locking member extending longitudinally of said first member toward one end thereof, said locking member including a duality of locking elements movable between
  - a relatively remote position with respect to each other
  - and a relatively adjacent position with respect to each other, said locking member including a laterally projecting flange, said first member having a first recess receiving said flange of said locking member for positioning said locking member on said first member, an annular member circumscribing said first member and movable axially between first and second positions relative to said first member,
- said annular member including surface means that in said first position of said annular member are adjacent said locking member for holding said locking elements in said relatively adjacent position and in said second position being remote from said locking member to permit said locking elements to move to said relatively remote position thereof, an additional member for preventing said locking elements from moving to said relatively adjacent position,
- said additional member having a laterally projecting flange, said first member having a second recess slidably receiving said flange of said additional member so that said additional member is movable longitudinally of said first member to a position intermediate said locking elements, post means on said second member,
- said post means being engageable with said additional member upon movement of said first and second members toward each other for moving said additional member from between said locking elements,
  - whereby said surface means of said annular member can hold said locking elements in said relatively adjacent position for engaging said post means and holding the same thereby to hold said first member to said second member, and resilient means in said second recess biasing said annular member toward said first position.

8. An electrical connector comprising
a plug assembly,
a receptacle assembly,
    one end of said plug assembly being adapted to enter said receptacle assembly,
        said plug and receptacle assemblies including electrical contacts for making electrical connections when said plug assembly so enters said receptacle assembly,
a plurality of posts projecting radially outwardly from the periphery of said receptacle assembly,
a sleeve circumscribing said plug assembly,
    said sleeve including a plurality of recesses therein,
        said recesses extending axially inwardly from one end of said sleeve,
            said recesses including a first pair of opposed walls inwardly of said one end of said sleeve,
            a second pair of opposed walls adjacent said one end of said sleeve,
            and a pair of walls interconnecting said first and second walls,
                said interconnecting walls being divergent toward said one end,
a longitudinally fixed locking member in each of said recesses,
    each locking member including a pair of fingers projecting toward said one end of said sleeve,
        said fingers being enlarged at their adjacent edges and enlarged at their outer edges adjacent their distal ends,
        said enlarged adjacent edges of said fingers being recessed,
    said sleeve being movable selectively between
        a first position where said first walls are adjacent said enlarged outer edges of said fingers
        and a second position in which said second walls are adjacent said outer edges of said fingers,
    said first walls of said recess being dimensioned to hold said fingers in a position of relative adjacency when said first walls are adjacent said enlarged outer edges of said fingers,
    said second walls of said recess being dimensioned to allow said fingers to spread apart laterally when said enlarged outer edges are adjacent said second walls,
        said fingers when in said position of relative adjacency being engageable with one of said posts that has so entered the recess thereof for retaining said post in said recess,
            whereby said locking members hold said plug and receptacle together,
means biasing said sleeve toward said first position thereof,
    said means including at least one element extending inwardly of the inner wall of said sleeve,
        said plug assembly including a groove in the periphery thereof,
            said groove including an annular portion,
    and a split annular undulant spring in said groove bearing against said element for biasing said element and hence said sleeve toward said one end of said plug assembly,
a longitudinally movable tongue interposed between said fingers in each of said recesses,
    each of said tongues having a convergent distal end
        and being movable intermediate said enlarged adjacent edges of said fingers when said fingers are adjacent said second walls for thereby holding said fingers apart,
and resilient means biasing each of said tongues to said position intermediate said enlarged adjacent edges of said fingers,
    said posts being engageable with said tongues upon advancement of said plug and receptacle assemblies toward each other for moving said tongues longitudinally of said plug out of said enlarged adjacent edges
        for permitting said first walls on said recess in said sleeve to hold said fingers in said position of relative adjacency for engaging said posts and securing said connector together.

9. An electrical connector comprising
a plug assembly,
a receptacle assembly,
    one end of said plug assembly being adapted to enter said receptacle assembly,
        said plug and receptacle assemblies including electrical contacts for making electrical connections when said plug assembly so enters said receptacle assembly,
a plurality of posts projecting radially outwardly from the periphery of said receptacle assembly,
a sleeve circumscribing said plug assembly,
    said sleeve including a plurality of recesses therein,
        said recesses extending axially inwardly from one end of said sleeve,
            said recesses including a first pair of opposed walls inwardly of said one end of said sleeve,
            a second pair of opposed walls adjacent said one end of said sleeve,
            and a pair of walls interconnecting said first and second walls,
                said interconnecting walls being divergent toward said one end,
a longitudinally fixed locking member in each of said recesses,
    each locking member including a pair of fingers projecting toward said one end of said sleeve,
        said fingers being enlarged at their adjacent edges and enlarged at their outer edges adjacent their distal ends,
        said enlarged adjacent edges of said fingers being recessed,
    said sleeve being movable selectively between
        a first position where said first walls are adjacent said enlarged outer edges of said fingers
        and a second position in which said second walls are adjacent said outer edges of said fingers,
    said first walls of said recess being dimensioned to hold said fingers in a position of relative adjacency when said first walls are adjacent said enlarged outer edges of said fingers,
    said second walls to said recess being dimensioned to allow said fingers to spread apart laterally when said enlarged outer edges are adjacent said second walls,
        said fingers when in said position of relative adjacency being engageable with one of said posts that has so entered the recess thereof for retaining said post in said recess,
            whereby said locking members hold said plug and receptacle together,
a longitudinally movable tongue interposed between said fingers in each of said recesses,
    each of said tongues having a convergent distal end
        and being movable intermediate said enlarged adjacent edges of said fingers when said fingers are adjacent said second walls for thereby holding said fingers apart,
and resilient means biasing each of said tongues to said position intermediate said enlarged adjacent edges of said fingers,
said posts being engageable with said tongues upon advancement of said plug and receptacle assemblies toward each other for moving said tongues longitudinally of said plug out of said enlarged adjacent edges
for permitting said first walls on said recess in said sleeve to hold said fingers in said position of relative adjacency for engaging said posts and securing said connector together,
each of said tongues including an elongated flat portion intermediate said fingers,
said portion having a convergent end adjacent said distal ends of said fingers,
each of said tongues having a flange extending radially inwardly from the opposite end thereof,
said plug assembly having an annular groove receiving said flanges of said tongues,
said resilient means including a split annular undulant spring in said annular groove bearing against said flanges of said tongues.

References Cited

UNITED STATES PATENTS

| | | | |
|---|---|---|---|
| 2,984,811 | 5/1961 | Hennessey et al. | 339—45 |
| 3,159,444 | 12/1964 | Stine | 339—45 |
| 3,171,183 | 3/1965 | Johnston | 24—230 |
| 3,207,536 | 9/1965 | Lawrence | 285—308 |

MARVIN A. CHAMPION, *Primary Examiner.*

J. H. McGLYNN, *Assistant Examiner.*